Aug. 14, 1956

C. L. POPP 2,758,917

METHOD FOR CLOSING AND PREVENTING LEAKS IN GAS MAINS

Filed Dec. 4, 1953

INVENTOR.
CHARLES L. POPP
BY
McMorrow, Berman & Davidson
ATTORNEYS

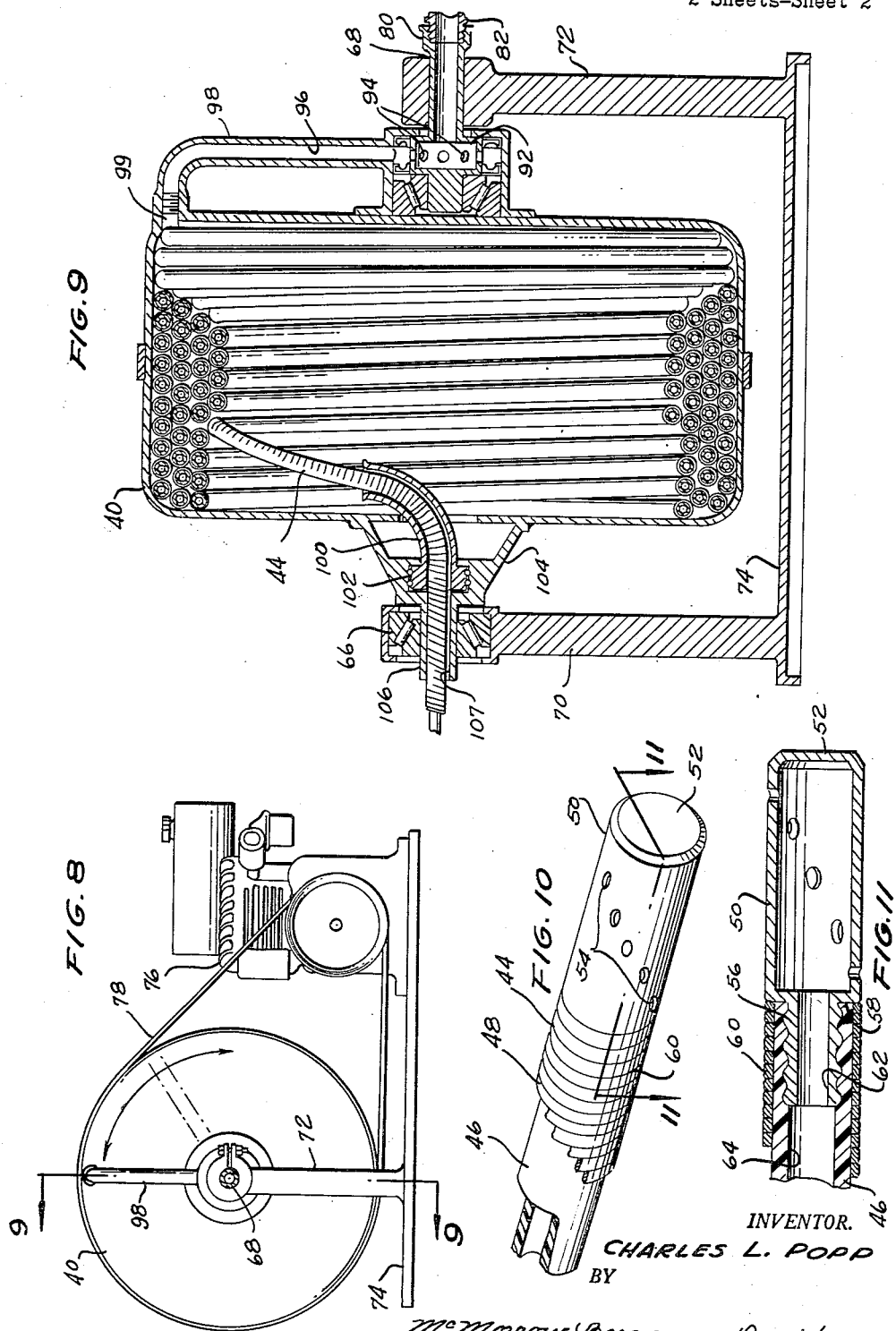

United States Patent Office 2,758,917
Patented Aug. 14, 1956

2,758,917
METHOD FOR CLOSING AND PREVENTING LEAKS IN GAS MAINS

Charles L. Popp, Jackson, Mich.

Application December 4, 1953, Serial No. 396,267

3 Claims. (Cl. 48—194)

This invention relates generally to gas mains and more particularly to a method and apparatus for stopping and preventing leaks in gas mains and their joints.

It is at the present time, the practice in spraying the inside of gas mains to close and prevent leaks therein, especially at the joints between the sections of the main, to tap the gas main line about every two hundred feet and then insert the hose through which the spray is introduced through a nozzle to the interior of the gas main sections. In order to tap the gas main, it is first necessary to dig a hole, and since the gas main is normally a considerable distance below the ground surface, the cost of digging the hole, tapping the main, and inserting the hose is considerable. The periodic spraying of the interior of the gas mains with a sealing compound is necessary since the packing in the joints between the gas main sections will eventually dry out and shrink, especially when synthesis gas which is dry in content is carried by the main permitting gas to escape. Also, the interior of the pipes comprising the gas main must be sprayed to prevent any corrosive action of the gas conducted in the main from causing injury to the pipe sections and also to insure settling or laying of all dust and/or dirt in the gas main. An example of the current method and apparatus employed is shown in the U. S. Patent No. 2,091,544.

It is therefore a principal object of this invention to provide a method and apparatus whereby the gas main need only be tapped every four hundred to eight hundred feet thereby increasing the speed by which the mains may be treated and also at the same time resulting in a considerable saving in cost of labor.

It is a further object of this invention to provide a method and apparatus whereby the sealing compound will be applied in the form of a spray which is radial with respect to the interior of the gas main rather than angular as in the present method. Thus, the present method results in greater coverage because the sealing compound is sprayed under pressure directly or radially upon the interior of the main and the main joints and also insures a more even coverage of the compound to the interior of the main as compared to the present angularly directed spray.

Other objects and advantages will become apparent from the following detailed description, forming the specification, and taken in conjunction with the accompanying drawings, wherein:

Figure 8 is a side elevational view of the reel drum and motor for driving it;

Figure 9 is a vertical cross sectional view taken on line 9—9 of Figure 8;

Figure 10 is a fragmentary perspective view, portions of which are broken away, showing the flexible pipe and the nozzle at the free end thereof; and Figure 11 is a cross sectional view taken on line 11—11 of Figure 10.

Figure 1:
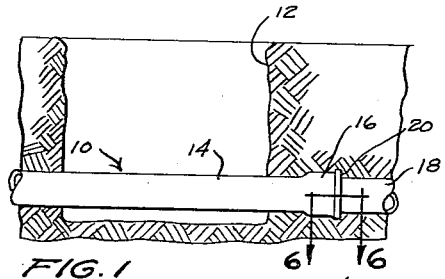
Figure 1 is a vertical cross sectional view showing the relation of the gas main to the ground surface with the hole being dug down to the gas main, the gas main being shown in elevation.

After a period of years of service, gas transmission and distribution systems in the form of gas mains usually leak as a result of changes in temperature affecting the metallic or cement portion of the joint through expansion and contraction of the pipe, or due to the drying out of the fibrous packing in the back of the joint between the pipe sections resulting from the action of the gas carried therethrough, or the packing in the joints may become affected by the corrosive action of the gas distributed through the main, or the uneven settling of the ground in which the gas main is laid may cause cracking of the joints between the pipe sections allowing the gas transmitted therethrough to leak out through the cracked or broken joints. Also, the corrosive action of the gas itself on the interior of the gas main pipe sections is undesirable and when continued over a long period of time, will, along with the corrosive action of the earth with which the main is surrounded, cause the pipe section to be so weakened as to cause a leak at that point.

The present method of treating the interior of the gas main pipe sections with a suitable sealing compound, normally in the form of liquid, by spraying it therein consists in introducing the liquid sealing compound to the inner surface of the mains and the joints thereof in the form of a spray applied directly to the interior of the main while the cable is withdrawn, the spray being radially forced from the source of spray. The method also includes introducing a flexible spraying conduit or duct in the form of the flow line and rotating this flow line as it is being introduced into the main.

The sealing compound employed may be one of the various liquids now used for this purpose.

With the above method, it will be possible to employ fewer taps in the treatment of the gas main since the flexible spraying conduit will be capable of a greater length of insertion due to the rotation imparted thereto. With the present method, a gas main may have one tap therein through which from four hundred to eight hundred feet may be treated in either direction from the tap location so that a total of up to sixteen hundred feet of gas main piping may be treated from a single location. Thus, the current method whereby a maximum of two hundred feet of gas main piping may be treated from two tapped locations will be rendered obsolete.

In addition, the present method, by employing a radially directed spray of the sealing compound, as opposed to the now used method wherein a spray which is angularly directed against the interior of the gas main is employed, greater and more even coverage of the compound to the interior of the main will result thereby possibly effecting a saving in the amount of compound used since the rate of withdrawal of the flow line may be increased, which also results in a saving of time in completing the gas main sealing operation.

While the accompanying drawings show a suitable combination of parts for carrying out the steps of the proposed method, the method is not confined to the exact apparatus shown as others suitable for this purpose may be employed.

With continued reference to the drawings, Figure 1 shows a gas main, generally indicated at 10, laid underground in the normal manner, and a hole or excavation 12 dug in the ground so as to expose a portion of a pipe section 14. The pipe section 14 has the usual bell end 16 within which is received the adjoining pipe section 18. A joint 20 between the adjoining pipe sections 14 and 18 is normally sealed with a gasket 22 and fibrous packing material 24 which surrounds the end of the pipe section 18 received in the bell end 16 of the pipe section 14.

Figure 2:
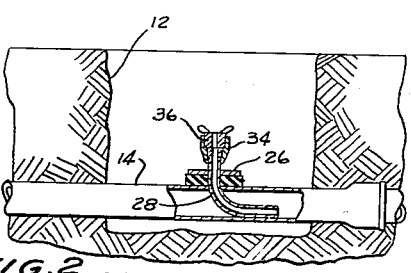
Figure 2 is a cross sectional view similar to Figure 1 showing the main tapped, the tap and a portion of the gas main being shown in vertical section.
Figure 6:
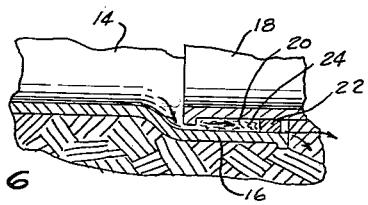
Figure 6 is a cross sectional view taken on line 6—6 of Figure 1 and showing a gas leak at the joint between joined pipe sections of the gas main.
Figure 5:
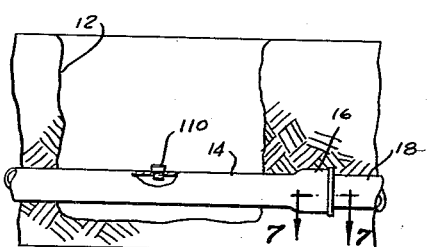
Figure 5 is a view similar to Figure 1 but showing a seal applied to the gas main after the present apparatus and tap have been removed.

As shown in Figure 6, this packing may become ineffective as a seal, due to one of many causes, thereby allowing the gas transmitted through the main to leak out of the joint. In order to treat the interior of the gas main 10 so as to stop such leaks as that shown in Figure 6 as well as treating the interior of the gas main 10 to prevent such leaks from occurring, the gas main 10 is tapped as shown in Figure 2. Specifically, the pipe section 14, a portion of which has been exposed by the excavation 12, is shown as being tapped.

In tapping the gas main pipe section 14, a special assembly 26 is inserted in the tapped hole 28 and is provided with a rubber gasket 30. This assembly 26 is provided with a pilot tube 32 which extends downward within the gas main with its discharge end parallel to the bottom of the gas main 10 and its upper end extending outwardly therefrom perpendicularly to the discharge end of the tube. The upper end of the pilot tube 32 carries thereon a clamp 34 provided with a resilient sealing gasket 36 and is adapted to receive the lower end of a guide tube 38. The guide tube 38 extends upwardly from the pilot tube 32 from its point of attachment thereto, so as to be in communication therewith, and is bent toward the drum or reel 40 so that the bell mouth 42 approximately in line with the axis of rotation of the drum or reel 40 which defines a winding means upon which a flexible spring conduit or duct 44 in the form of a plastic tube 46 inserted within a flexible hollow tube formed by spirally wound wire 48 which is wound on the drum or reel 40.

The flexible conduit or tube 44 is received in the guide tube 38 through the bell mouth 42 and extends therethrough and also through the pilot tube 32 so as to extend into the interior of the gas main 10. The free end of the flexible conduit or tube is provided with a nozzle 50 (Figure 10) which is in the form of a hollow cylinder, preferably of metal but a suitable plastic material may also be employed, the terminal end 52 being closed and the side wall of the nozzle being provided with a plurality of apertures 54 arranged in spaced relation and in a spirally manner thereabout. Each of the apertures 54 communicate with the interior of the nozzle 50 so that sealing compound carried in the flexible tube or flow line 44 may be sprayed radially therefrom. The nozzle 50 projection 56 extending centrally from the end 58 thereof remote from the capped end 52, the extension or projection 56 being of a smaller diameter than the nozzle 50 and formed integrally therewith and being provided with external threading to be received in complementary internal threading provided at the free end 60 of the flexible conduit or tube 44. The projection 56 has a central bore 62 longitudinally therethrough communicating at one end in which the interior 64 of the flexible conduit or tube 44 and at its other end with the interior of the hollow cylindrical nozzle 50 to define a passage between the interior of the flexible tube and the interior of the nozzle. This construction is clearly shown in Figure 11.

With reference to the drum or reel 40 and to the construction thereof as shown in Figures 8 and 9, it will be seen that the drum or reel 40 is mounted for rotation in bearings 66 and 68 carried at the top of upstanding, spaced, parallel standards 70 and 72 respectively which are formed integrally upon a horizontal base 74 and upon which base is also mounted a gasoline motor 76 which imparts rotational movement to the drum or reel 40 through a drive belt 78 which operatively connects the reel 40 to the motor 76.

The sleeve bearing 68 is provided at its outer end, remote from the reel 40, with an enlarged portion 80 which is provided with internal threading to receive therein the externally threaded coupling 82 of a flexible hose 84 which is connected at its other end to a pump 85 carried in a trailer 86, which trailer also carries thereon a reservoir 88 containing the sealing compound or liquid to be sprayed to the interior of the gas main. The sealing compound or liquid in the reservoir 88 is fed into the pump 85 through a hose 90.

It will be seen that the sleeve bearing 88 is hollow so that it may communicate with the interior of the hose 84 when coupled thereto and leads at its other end to a collar 92 having a plurality of spaced holes 94 in communication with the bore centrally therethrough which is in communication with the hollow interior of the sleeve bearing 68. So that upon rotation of the reel 40, with the hose 84 connected to the bearing 68, the sealing compound or liquid will be forced through the bearing 68 and into the collar 92 and out of the spaced holes 94 circumferentially thereon and upwardly through a bore or passage 96 provided in a housing 98 carried by the reel 40 and threadingly receiving at its end remote from the collar 92 the end 99 of the flexible conduit or pipe 44 remote from the free end 60 thereof so that the sealing compound or fluid may be forced through the flexible conduit 44 wound on the reel 40 and thence through that portion of the conduit inserted into the gas main 10.

The drum or reel 40 also includes a feed tube 100 which is mounted in a ball bearing 102 carried in the body of a support bracket 104 formed as a part of the reel or drum 40 and extending outwardly therefrom to terminate in a sleeve bearing 106 rotatably carried in the bearing 66 carried on the standard 70. As clearly shown in Figure 9, the feed tube 100 is adapted to receive therein the flexible conduit 44 which then passes through the central bore 107 in the sleeve bearing 106 so that the flexible conduit or flow line is fed out or paid off from the reel 40 along the axis of rotation of the reel. Since the feed tube 100 is rotatably mounted at one end in the ball bearing 102, the feed tube will have rotation imparted thereto by the rotation of the reel or drum 40, and the feed tube 100 will impart rotation to the flow line as it passes therethrough when being reeled off the drum 40 in response to rotation thereof imparted thereto by the source of power or motor 76.

Figure 3:
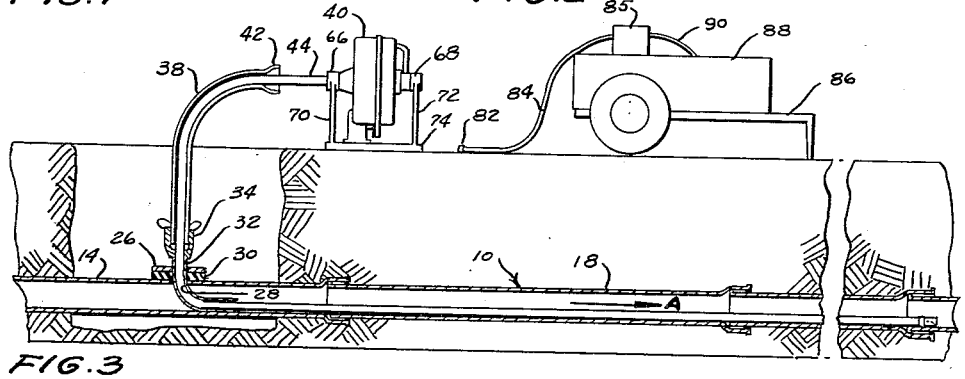
Figure 3 is a fragmentary vertical cross sectional view of the gas main and its relation to the ground surface showing the apparatus of the present invention inserted therein.
Figure 4:
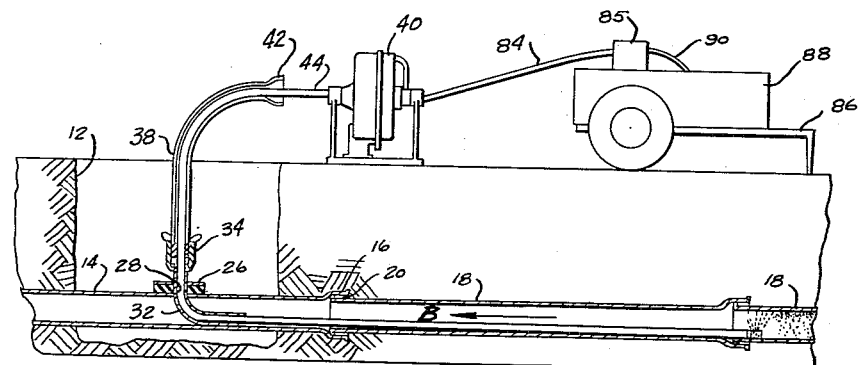
Figure 4 is a view similar to Figure 3 but showing the apparatus being withdrawn from the gas main and applying the sealing compound to the interior thereof.

In Figure 1 there are shown two pipe sections 14 and 18 of a gas main 10 which are joined together at the joint 20, the joint 20 having a leak or being broken, as shown in Figure 6, so as to permit escape of the gas transmitted through the main 10. In order to stop this leak, as well as to prevent the occurrence of future leaks at the joints of the connected sections of the main and at other places along the length of the main, the pipe section 14 which is exposed by the excavation 12 is tapped as shown in Figure 2 and a guide tube attached to the special assembly 26 which comprises the tapping means. The free end 60 of the flexible flow line 44 is inserted into the bell mouth 42 of the guide tube 38 and downwardly therethrough and into the pilot tube 32, the end of the pilot tube 28 remote from the guide tube 38 being turned as to open into the direction the flexible pipe or conduit 44 is intended to extend in the gas main 10, or to the right as shown in Figures 2 and 3.

With the flow line 44 extending within the gas main 10 at the pipe section 14 thereof, the source of power or gasoline engine 76 is started to impart rotation in a clockwise direction to cause the flow line 44 to be reeled or payed out from the drum 40. At the same time, the feed tube 100 which is also rotating but not at the same speed as the drum will impart rotation to the flow line 44 as it is payed out from the drum 40. Due to the rotation imparted to the flow line 44 as it is being fed off of the reel 40 and into the gas main 10 through the tapped pipe section 14, it will be apparent that a considerably greater penetration as to length of insertion of the flow line 44 can be attained because the positive rotation imparted to the flow line 44 will render the length thereof extending from the end of the pilot tube 32 more rigid than if no positive rotation were imparted thereto. Hence, it will be apparent that the flow line 44 will be capable of from two to four times the length of insertion into a gas main than with the method and apparatus currently employed for this purpose. In this connection, it should be borne in mind that the capacity of the drum or reel 40 is merely limited by its size so that as much as one thousand to fifteen hundred feet of flexible pipe 44 may be carried thereon.

After the flexible flow line has been inserted into the gas main 10 to the desired length of penetration, from four hundred to eight hundred feet, the engine 76 is stopped and the hose 84 is coupled to the sleeve bearing 68 so that upon resumption of operation of the engine 76 and operation of the pump 85, a suitable sealing compound, usually in the form of a liquid, may be forced under pressure to flow through the flexible line 44 and emerge in a radial spray from the nozzle 50 carried by the free end 60 of the line 44. In the spraying operation, a reversing clutch (not shown) normally associated with gasoline engines of the type illustrated by the engine 76, will be moved or shifted so as to impart rotation to the drum or reel in a counter-clockwise direction to thereby reel in the flexible line 44 as the spray emerges from the nozzle 50.

Figure 7:
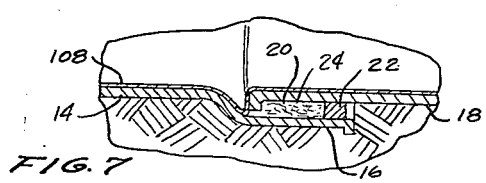
Figure 7 is a cross sectional view taken on line 7—7 of Figure 5 showing the leaking joint of Figure 6 now sealed by the application of the sealing compound.

In the spraying or rewinding operation, the flexible line 44 will also have rotation imparted thereto by the rotation of the feed tube 100 so that the radial spray emerging from the nozzle 50 will be evenly distributed along the interior of the gas main 10 to form a coating 108 to thereby seal any of the leaking joints, such as the joint 20, and as illustrated in Figure 7 where the coating 108 as shown as closing the joint 20 to prevent further leakage of gas therethrough as shown by the arrows in Figure 6. Upon withdrawal of the flexible flow line 44 from the gas main 10 and from the guide tube 38, the special tapping assembly 26 will be removed and a standard pipe plug 110 of required size applied to the tapped section 41 so as to seal the tapped hole 28.

Before sealing the tapped hole 28 with the sealing pipe plug 110, the pilot tube 32 may be turned one hundred and eighty degrees so as to extend into the pipe section 14 of the gas main 10 in a direction opposite to the direction shown in Figures 2 and 3, and the insertion of the flexible flow line 44 and the subsequent rewinding and spraying operation repeated in a manner similar to that just described. It will be noted that in Figure 2, the arrow A shows the direction of insertion of the flexible flow line while the arrow B in Figure 3 shows the direction of travel of the flow line 44 when rewound upon the drum 40 during the spraying operation.

From the foregoing, it will be apparent that the method and apparatus of this invention will enable the closing and preventing of leaks in gas mains and their joints to a length of up to sixteen hundred feet of the gas main from a single tapped location in the gas main.

From the foregoing, it will be apparent that there has been provided a method of closing and preventing leaks in gas mains in their joints which comprises the steps of tapping the gas main, then inserting therein a flow line to which positive rotation has been imparted simultaneously with its insertion into the main, and then applying a liquid sealing compound under pressure to the interior of the main while the flow line is being withdrawn from the main. Also, the positive rotation imparted to the flow line will be simultaneous with the withdrawal of the flow line so as to insure even coverage of the interior of the main and at the same time permit the flow line to be withdrawn more rapidly than now possible since the spray which applies the liquid to the interior of the main is radial and a greater coverage will result. The apparatus, which provides one means of carrying out the method, includes a rotatable drum 40 with a flexible flow line 44 wound thereon, means defined by the feed tube 100 carried by the drum 40 imparting positive rotation to the flow line 44 as it is payed out from the drum. Also, in the apparatus, there is provided means operatively connected to the flexible line 44 to supply liquid under pressure into the line, this means being defined by reservoir 88, liquid pump 85, hose 84 between the pump 85 and the drum bearing 68 and the bore 96 in the housing 98 carried by the drum 40.

While there are shown and described the preferred embodiments of the invention, it is to be understood that the structure is susceptible to change and modification within the practicability of the invention and therefore should be limited only by the scope of the claims appended hereto.

What is claimed is:

1. A method for closing and preventing leaks in gas mains which comprises the steps of causing a flow line while being rotated to be progressively advanced to a selected point in a tapped main, and causing a liquid sealing compound to be ejected from the tip portion of the flow line when the latter has been advanced to the selected point in the form of a plurality of jets arranged in a longitudinal row in the tip portion and extending at an angle to the longitudinal axis of the flow line while the flow line is being rotated and progressively withdrawn from the main.

2. A method for closing and preventing leaks in gas mains which comprises the steps of tapping the main, inserting a flow line into the main through the tap, imparting positive rotation to the flow line while advancing it in the main to a selected point remote from the tap, and causing a liquid sealing compound to be ejected from the tip portion of the flow line when the latter has been advanced to the selected point in the form of a plurality of jets arranged in a longitudinal row in the tip portion and extending at an angle to the longitudinal axis of the flow line while the flow line is being rotated and progressively withdrawn from the main.

3. A method for closing and preventing leaks in gas mains which comprises the steps of tapping the main, inserting a flow line into the main through the tap, imparting positive rotation to the flow line while advancing it in the main to a selected point remote from the tap, introducing a liquid sealing compound into said flow line when it has been advanced to the selected point to be sprayed against the interior of the main in the form of a plurality of jets arranged in a longitudinal row in the tip portion of the flow line and disposed at an angle to the longitudinal axis of the flow line while imparting positive rotation to the flow line, and progressively withdrawing the flow line from the main through said tap.

References Cited in the file of this patent

UNITED STATES PATENTS

| | | |
|---|---|---|
| 1,704,364 | Markley | Mar. 5, 1929 |
| 1,761,191 | Browning | June 3, 1930 |
| 1,837,904 | Hanelt | Dec. 22, 1931 |
| 2,091,544 | Hitz | Aug. 31, 1937 |
| 2,102,917 | Rolland | Dec. 21, 1937 |
| 2,108,319 | Perkins | Feb. 15, 1938 |
| 2,167,268 | Sanger | July 25, 1939 |
| 2,316,140 | Skeen | Apr. 6, 1943 |
| 2,386,455 | Green | Oct. 9, 1945 |
| 2,490,353 | Hannay | Dec. 6, 1949 |
| 2,520,397 | Green | Aug. 29, 1950 |